(12) United States Patent
Uchiyama

(10) Patent No.: US 9,030,592 B2
(45) Date of Patent: May 12, 2015

(54) INTERCHANGEABLE LENS ATTACHABLE TO IMAGE PICKUP APPARATUS THAT PROVIDE CONTRAST AF, CONTROL METHOD THEREFOR, IMAGE PICKUP APPARATUS AND CONTROL METHOD THEREFOR

(71) Applicant: Canon Kabushiki Kaisha, Tokyo (JP)

(72) Inventor: Minoru Uchiyama, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/896,821

(22) Filed: May 17, 2013

(65) Prior Publication Data
US 2013/0308039 A1 Nov. 21, 2013

(30) Foreign Application Priority Data
May 17, 2012 (JP) .................................. 2012-113614

(51) Int. Cl.
*H04N 5/232* (2006.01)
*H04N 5/225* (2006.01)

(52) U.S. Cl.
CPC ....... *H04N 5/23212* (2013.01); *H04N 5/23209* (2013.01)

(58) Field of Classification Search
CPC ........................ H04N 5/23212; H04N 5/23296

USPC .......................................... 348/345, 347, 358
See application file for complete search history.

(56) References Cited

U.S. PATENT DOCUMENTS 8,311,407 B2  11/2012  Shibuno et al.

FOREIGN PATENT DOCUMENTS

| JP | 02-146009 A | 6/1990 |
| JP | 2009258718 A | 11/2009 |
| JP | 2011257450 A | 12/2011 |

*Primary Examiner* — Joel Fosselman
(74) *Attorney, Agent, or Firm* — Rossi, Kimms & McDowell LLP

(57) ABSTRACT

The interchangeable lens includes a focus actuator to move a focus lens, a memory storing speed control data for the focus actuator and end position data showing infinity side and close side end positions of a movable range of the focus lens, a lens controller to control the drive speed of the focus actuator by using the speed control data. The lens controller receives, from an image pickup apparatus, timing information showing a timing relating to acquisition of focus information, performs an end reachability determination for predictively determining, by using the timing information, the speed control data and the end position data, whether or not the focus lens reaches the infinity side or close side end position by a scheduled focus information acquisition timing, and sends information showing a result of the end reachability determination to the image pickup apparatus.

13 Claims, 11 Drawing Sheets

FOCUS ACTUATOR ACCELERATION DATA

| ACCELERATION SPEED | ACCELERATION STEP NUMBER |
|---|---|
| 200pps | 1step |
| 300pps | 1step |
| 400pps | 1step |
| 500pps | - |

FOCUS ACTUATOR DECELERATION DATA

| DECELERATION SPEED | DECELERATION STEP NUMBER |
|---|---|
| 500pps | - |
| 400pps | 1step |
| 300pps | 1step |
| 200pps | 1step |

ACQUISITION START TIMING IS DURING ACCELERATION DRIVE

ACQUISITION START TIMING IS DURING CONSTANT-SPEED DRIVE

ACQUISITION START TIMING IS DURING DECELERATION DRIVE TIMING

FOCUS ACTUATOR ACCELERATION DATA

| ACCELERATION SPEED | ACCELERATION STEP NUMBER |
|---|---|
| 200pps | $5 \times 10^{-3}$ s |
| 300pps | $5 \times 10^{-3}$ s |
| 400pps | $5 \times 10^{-3}$ s |
| 500pps | - |

FOCUS ACTUATOR DECELERATION DATA

| DECELERATION SPEED | DECELERATION STEP NUMBER |
|---|---|
| 500pps | - |
| 400pps | $5 \times 10^{-3}$ s |
| 300pps | $5 \times 10^{-3}$ s |
| 200pps | $5 \times 10^{-3}$ s |

FIG. 9

INTERCHANGEABLE LENS ATTACHABLE TO IMAGE PICKUP APPARATUS THAT PROVIDE CONTRAST AF, CONTROL METHOD THEREFOR, IMAGE PICKUP APPARATUS AND CONTROL METHOD THEREFOR

BACKGROUND OF THE INVENTION

1. Field of the Invention

The present invention relates to an interchangeable lens attachable to an image pickup apparatus capable of performing so-called contrast AF.

2. Description of the Related Art

Image pickup apparatuses such as digital still cameras and video cameras acquire or produce, from a video signal obtained through photoelectric conversion of an object image by an image sensor, an focus evaluation value signal (focus information) that shows a contrast state of video (imaging contrast). The image pickup apparatuses move a focus lens to an in-focus position where the focus evaluation value signal becomes maximum to perform a contrast detection method autofocus (contrast AF). The contrast AF is also called TVAF.

For the contrast AF, a relationship between the focus evaluation value signal and a position of the focus lens for acquisition thereof is important. Particularly, in a lens-interchangeable image pickup apparatus to which an interchangeable lens is detachably attachable, since the image pickup apparatus produces the focus evaluation value signal and the interchangeable lens drives the focus lens, it is necessary to appropriately manage timings for acquisition of the focus evaluation value signal and timings for drive of the focus lens.

Japanese Patent Laid-Open No. 2009-258718 discloses a method of setting drive timings of a focus lens in a lens-interchangeable image pickup system performing contrast AF. Moreover, Japanese Patent Laid-Open No. 2011-257450 discloses a method for improving focusing accuracy in which an interchangeable lens performs an in-focus position calculation using focus lens positions detected according to a synchronization signal from an image pickup apparatus performing contrast AF.

Furthermore, Japanese Patent Laid-Open No. 02-146009 discloses an autofocus apparatus that decides a driving mode of a focus lens, on a basis of information on end positions (infinity end and close end) of a movable range of the focus lens, so as to reduce impact when the lens reaches the end position.

If the lens-interchangeable image pickup apparatus is capable of managing the drive timing of the focus lens without delay with respect to the acquisition timing of the focus evaluation value signal, it is possible to always acquire the focus evaluation value signal at appropriate focus lens positions and there is no problem. However, it is difficult for the image pickup apparatus to perform communication with the interchangeable lens to send thereto an instruction for causing the interchangeable lens to start drive of the focus lens and an instruction for causing the interchangeable lens to acquire a reaching position of the focus lens without timing delay while performing other processes.

To solve the problem, the image pickup apparatus may perform calculation of a predictive position of the focus lens. However, interchangeable lenses of mutually different types perform mutually different speed controls (acceleration and deceleration controls) for an actuator such as a motor. Therefore, it is not easy for the image pickup apparatus to accurately calculate the predictive position of the focus lens without delay with respect to actual drive of the focus lens.

Moreover, even if the predictive position of the focus lens can be calculated, if that predictive position is located more outside than an end of a movable range of the focus lens, it is impossible to move the focus lens to the predictive position and thus to obtain the focus evaluation value signal at the predictive position, so that it is necessary to take some measures for processes of the contrast AF.

BRIEF SUMMARY OF THE INVENTION

The present invention provides an interchangeable lens capable of causing an image pickup apparatus to perform appropriate contrast AF according to a relation between a movable range of a focus lens and a predictive position thereof, and provides an image pickup apparatus capable of performing such appropriate contrast AF.

The present invention provides as one aspect thereof an interchangeable lens detachably attachable to an image pickup apparatus and capable of communicating with the image pickup apparatus. The interchangeable lens includes an image pickup optical system including a focus lens, a focus actuator to move the focus lens, a first memory to store speed control data to be used for control of drive speed of the focus actuator, a second memory to store end position data showing an infinity side end position and a close side end position of a movable range of the focus lens, and a lens controller configured to control the drive speed of the focus actuator by using the speed control data. The image pickup apparatus includes an image sensor to photoelectrically convert an object image formed by the image pickup optical system into an image pickup signal, and a focus controller configured to acquire, by using the image pickup signal, focus information corresponding to image contrast that changes with movement of the focus lens and to control a focusing movement of the focus lens to an in-focus position by using the focus information. The lens controller is configured to receive, from the focus controller, timing information showing a timing relating to acquisition of the focus information, to perform an end reachability determination for predictively determining, by using the timing information, the speed control data and the end position data, whether or not the focus lens reaches one of the infinity side and close side end positions by a scheduled focus information acquisition timing at which the focus controller is to acquire the focus information, and to send result information showing a result of the end reachability determination to the focus controller.

The present invention provides as another aspect thereof a control method for an interchangeable lens detachably attachable to an image pickup apparatus and capable of communicating with the image pickup apparatus. The interchangeable lens includes an image pickup optical system including a focus lens; and a focus actuator to move the focus lens, and the image pickup apparatus photoelectrically converting, by an image sensor, an object image formed by the image pickup optical system into an image pickup signal, acquiring, by using the image pickup signal, focus information corresponding to image contrast that changes with movement of the focus lens, and controlling a focusing movement of the focus lens to an in-focus position by using the focus information. The method includes providing speed control data to be used for control of drive speed of the focus actuator, providing end position data showing an infinity side end position and a close side end position of a movable range of the focus lens, controlling the drive speed of the focus actuator by using the speed control data, receiving, from the image pickup apparatus, timing information showing a timing relating to acquisition of the focus information, performing an end reachability determination for predictively determining, by using the timing information, the speed control data and the end position data, whether or not the focus lens reaches one of the infinity side and close side end positions by a scheduled focus information acquisition timing at which the focus controller is to acquire the focus information, and sending result information showing a result of the end reachability determination to the image pickup apparatus.

The present invention provides as still another aspect thereof an image pickup apparatus to which an interchangeable lens is detachably attachable and which is capable of communicating with the interchangeable lens. The interchangeable lens includes an image pickup optical system including a focus lens; a focus actuator to move the focus lens, a first memory to store speed control data to be used for control of drive speed of the focus actuator, a second memory to store end position data showing an infinity side end position and a close side end position of a movable range of the focus lens, and a lens controller configured to control the drive speed of the focus actuator by using the speed control data. The image pickup apparatus includes an image sensor to photoelectrically convert an object image formed by the image pickup optical system into an image pickup signal, and a focus controller configured to acquire, by using the image pickup signal, focus information corresponding to image contrast that changes with movement of the focus lens and to control a focusing movement of the focus lens to an in-focus position by using the focus information. The focus controller is configured to send, to the lens controller, timing information showing a timing relating to acquisition of the focus information. The lens controller is configured to perform an end reachability determination for predictively determining, by using the timing information, the speed control data and the end position data, whether or not the focus lens reaches one of the infinity side and close side end positions by a scheduled focus information acquisition timing at which the focus controller is to acquire the focus information, and to send result information showing a result of the end reachability determination to the focus controller. The focus controller performs the focus control by using the result information.

The present invention provides as yet still another aspect thereof a control method for an image pickup apparatus to which an interchangeable lens is detachably attachable. The interchangeable lens includes an image pickup optical system including a focus lens, a focus actuator to move the focus lens, a first memory to store speed control data to be used for control of drive speed of the focus actuator; and a second memory to store end position data showing an infinity side end position and a close side end position of a movable range of the focus lens. The interchangeable lens controls the drive speed of the focus actuator by using the speed control data. The image pickup apparatus includes an image sensor to photoelectrically convert an object image formed by the image pickup optical system into an image pickup signal, and a focus controller configured to acquire, by using the image pickup signal, focus information corresponding to image contrast that changes with movement of the focus lens and to control a focusing movement of the focus lens to an in-focus position by using the focus information. The method including sending, to the interchangeable lens, timing information showing a timing relating to acquisition of the focus information, receiving, from the interchangeable lens that performs an end reachability determination for predictively determining, by using the timing information, the speed control data and the end position data, whether or not the focus lens reaches one of the infinity side and close side end positions by a scheduled focus information acquisition timing at which the focus controller is to acquire the focus information, result information showing a result of the end reachability determination, and performing the focus control by using the result information.

Other aspects of the present invention will become apparent from the following description and the attached drawings.

BRIEF DESCRIPTION OF THE DRAWINGS

FIG. 9 shows focus actuator acceleration table data and focus actuator deceleration table data in Embodiment 2 of the present invention.

DETAILED DESCRIPTION OF THE PREFERRED EMBODIMENTS

Exemplary embodiments of the present invention will hereinafter be described with reference to the accompanying drawings.

[Embodiment 1]

Figure 1:
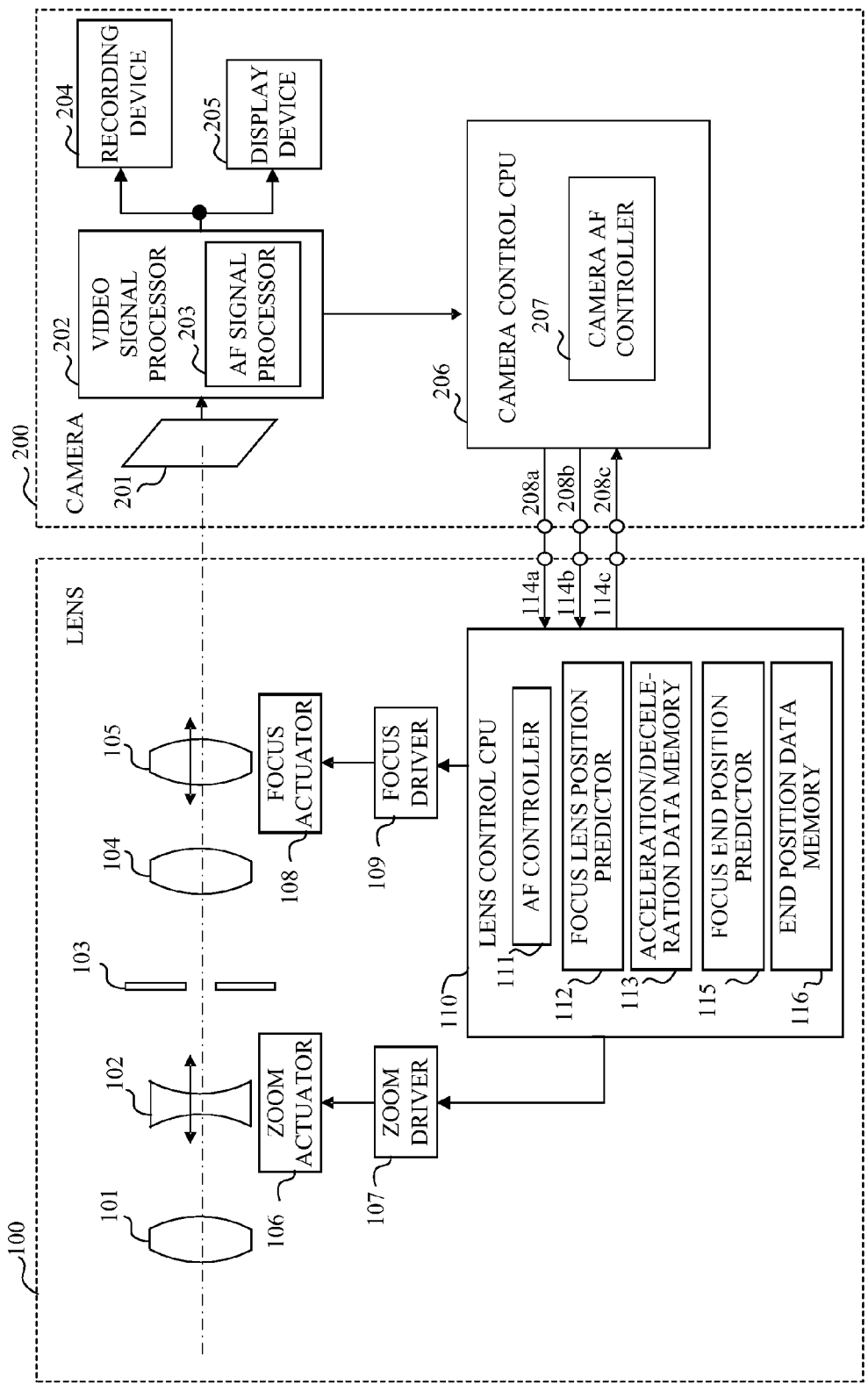
FIG. 1 is a block diagram showing a configuration of a lens-interchangeable image pickup system that is Embodiment 1 of the present invention, the system including an interchangeable lens and a camera.

FIG. 1 shows a configuration of a lens-interchangeable image pickup system constituted by an interchangeable lens 100 and an image pickup apparatus (hereinafter referred to as "a camera body") 200 to which the interchangeable lens 100 is detachably attachable.

In this embodiment, the camera body 200 controls drive of a focus lens 105 (actually, drive of a focus actuator 108 that moves the focus lens 105) provided in the interchangeable lens 100 to perform contrast AF (TVAF). Specifically, the camera body 200 acquires a focus evaluation value signal (described later) as focus information after each movement of the focus lens 105 by a predetermined amount and moves the focus lens 105 to an in-focus position by using the focus evaluation value signal.

Figures 6, 7A:
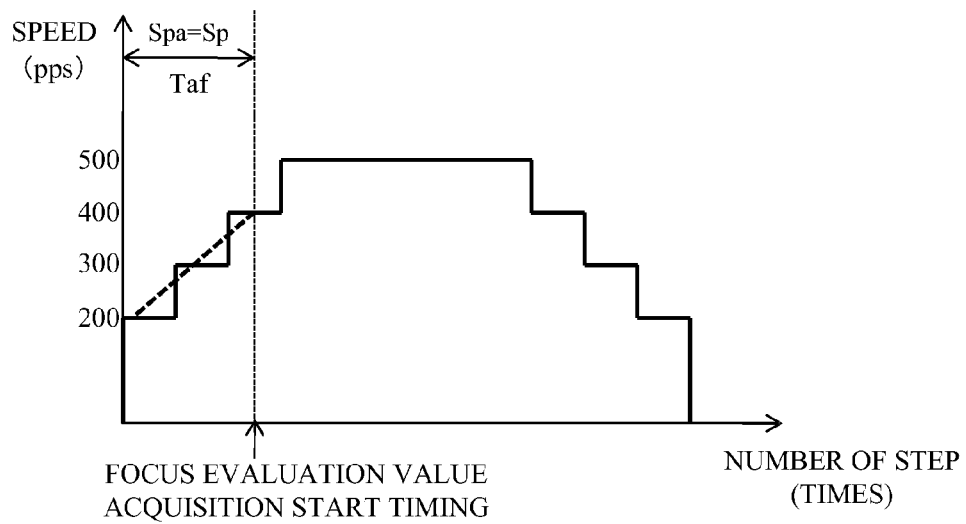
FIG. 6 shows focus actuator acceleration table data and focus actuator deceleration table data in Embodiment 1.
FIGS. 7A to 7C show focus evaluation value acquisition timings and focus lens drive patterns in Embodiment 1.

In the contrast AF, the interchangeable lens 100 determines in terms of time, by using focus actuator acceleration data and focus actuator deceleration data, whether or not the focus lens 105 is able to reach a target position (hereinafter referred to as "a target focus evaluation value acquisition position") at which the camera body 200 acquires the focus evaluation value signal by a scheduled timing (hereinafter referred to as "a scheduled focus evaluation value acquisition timing") for the acquisition thereof. The target focus evaluation value acquisition position and the scheduled focus evaluation value acquisition timing respectively correspond to a target focus information acquisition position and a scheduled focus information acquisition timing. Moreover, the focus actuator acceleration data and the focus actuator deceleration data, which correspond to speed control data and are hereinafter collectively referred to as "acceleration/deceleration data", are, as shown in FIG. 6, table data including information on speed (pps) and number of steps (step) for acceleration and deceleration of the focus actuator 108. The number of steps for acceleration and the number of steps for deceleration are hereinafter respectively referred to as "an acceleration step number" and "a deceleration step number". The acceleration/deceleration data is stored (provided) in an acceleration/deceleration data memory (described later) in advance. Furthermore, information on the target focus evaluation value acquisition position is sent from the camera body 200 to the interchangeable lens 100.

The interchangeable lens 100 performs, when determining in the above-mentioned target reachability determination in terms of time that the focus lens 105 is not able to reach the target focus evaluation value acquisition position by the scheduled focus evaluation value acquisition timing, calculation of a predictive position of the focus lens 105 at the scheduled focus evaluation value acquisition timing by using the acceleration/deceleration data. The position of the focus lens 105 is hereinafter referred to as "a focus position". In addition, the interchangeable lens 100 sends the calculated predictive position of the focus lens 105 (hereinafter referred to as "a predictive focus position") as a result of this prediction calculation to the camera body 200. On the other hand, when determining in the above-mentioned target reachability determination that the focus lens 105 is able to reach the target focus evaluation value acquisition position by the scheduled focus evaluation value acquisition timing, the interchangeable lens 100 does not perform the prediction calculation of the predictive focus position by using the acceleration/deceleration data. In this case, the interchangeable lens 100 sends, as the predictive focus position at the scheduled focus evaluation value acquisition timing, a position identical to the target focus evaluation value acquisition position to the camera body 200.

As shown in FIG. 1, attachment of the interchangeable lens 100 to the camera body 200 brings electrical contacts 114*a*, 114*b* and 114*c* provided in the interchangeable lens 100 in contact with electrical contacts 208*a*, 208*b* and 208*c* provided in the camera body 200. This contact of the electrical contacts enables communication of various information between the interchangeable lens 100 and the camera body 200 and enables supply of power from the camera body 200 to the interchangeable lens 100.

In the interchangeable lens 100, an image pickup optical system includes, in order from an object side in an optical axis direction, a fixed front lens 101, a magnification-varying lens 102, an aperture stop 103, a fixed afocal lens 104 and the focus lens 105. Although FIG. 1 shows as if each of the lenses 101, 102, 104 and 105 is constituted of one lens element, each of the lenses 101, 102, 104 and 105 is actually constituted of one or two or more lens elements.

The magnification-varying lens 102 is moved in the optical axis direction for variation of magnification by a zoom actuator 106 constituted by a stepping motor, a DC motor or the like. A zoom driver 107 supplies a drive current to the zoom actuator 106.

The focus lens 105 is moved in the optical axis direction for focusing by the focus actuator 108 constituted by a stepping motor, a voice coil motor or the like. A focus driver 109 supplies a drive current to the focus actuator 108.

On the other hand, the camera body 200 is provided with an image sensor 201 as a photoelectric conversion element such as a CCD sensor or a CMOS sensor. The image sensor 201 photoelectrically converts an optical image (object image) formed on its image pickup surface by the image pickup optical system. Charges accumulated in the image sensor 201 by its photoelectric conversion is output as an image pickup signal (analog signal) at a predetermined timing to be input to a video signal processor 202.

The video signal processor 202 converts the analog image pickup signal from the image sensor 201 into a digital image pickup signal and performs various signal processes thereon to produce a video signal. The video signal is output to a camera control CPU 206, a display device 205 such as a liquid crystal panel and to a recording device 204 such as an optical disc or a semiconductor memory.

Moreover, the video signal processor 202 is provided therein with an AF signal processor 203 as a focus information producer. The AF signal processor 203 extracts, from the image pickup signal output from the image sensor 201 (or from the video signal produced by using the image pickup signal), a high frequency component or a brightness component obtained by pixels in an AF area (focus detection area) to produce the focus evaluation value signal (focus information). The focus evaluation value signal shows a contrast state (or sharpness) of captured video, that is, image information which changes with movement of the focus lens 105. A focus position at which value of the focus evaluation value signal (hereinafter referred to as "focus evaluation value") becomes maximum (peak) is an in-focus position in the AF area.

A camera control CPU 206 includes a camera AF controller 207. The camera AF controller 207 performs, by using the focus evaluation value signal from the AF signal processor 203, determination of a direction of the in-focus position (hereinafter referred to as "an in-focus direction") and determination of whether or not an in-focus state is obtained. Moreover, the camera AF controller 207 sends instructions relating to drive of the focus lens 105 to a lens control CPU 110 provided in the interchangeable lens 100. The camera AF controller 207 thus performs focus control. The signal processor 203 and the camera AF controller 207 constitute a focus controller.

As described above, the interchangeable lens 100 and the camera body 200 can communicate with each other through the electric contacts 114*a* to 114*c* and the electric contacts 208*a* to 208*c*. FIG. 1 shows a case where the interchangeable lens 100 and the camera body 200 perform three-line serial communication. In this embodiment, the lens control CPU 110 and the camera control CPU 206 performs packet communication at timings synchronizing with a vertical synchronization signal of the captured video.

From the lens control CPU 110 to the camera control CPU 206, a primary communication is performed for sending various information including information on the predictive focus position and information on an end reachability determination described later. On the other hand, from the camera control CPU 206 to the lens control CPU 110, a secondary communication is performed for sending timing information and target focus position information. The timing information shows timings relating to the acquisition of the focus evaluation value signal such as a start timing of the acquisition of the focus evaluation value signal (which is the above-mentioned scheduled focus evaluation value signal acquisition timing and hereinafter also referred to as "a focus evaluation value acquisition start timing") and a start timing for the movement of the focus lens 105 (hereinafter also referred to as "a drive start timing"). The target focus position information shows a focus position at which the focus evaluation value signal is acquired, that is, the above-mentioned target focus evaluation value signal acquisition position, and is hereinafter also referred to as "a target focus position" or "a target position".

In the following description, the timing information and the target focus position information are collectively referred to as "focus control information". The primary communication and the secondary communication are respectively performed at least once in one period of the vertical synchronization signal.

The lens control CPU 110 as a lens controller includes the lens AF controller 111, a focus lens position predictor 112 and an acceleration/deceleration data memory 113. In addition, the lens control CPU 110 includes a focus end position predictor 115 and an end position data memory 116.

The lens AF controller 111 controls the movement of the focus lens 105 to the target focus position that is decided by the camera AF controller 207 and sent from the camera control CPU 206.

The focus position predictor 112 performs, in the contrast AF, the target reachability determination to predict in terms of time whether or not the focus position is able to reach the target focus position by the focus evaluation value acquisition start timing, which are decided by the camera AF controller 207 (camera body 200). Moreover, the focus position predictor 112 calculates the predictive focus position. The target reachability determination and calculation of the predictive focus position will be described below.

The acceleration/deceleration data memory 113 as a first memory is constituted by a storage element such as an EEPROM or a flash ROM and stores the actuator acceleration/deceleration data as table data.

The focus end position predictor 115 performs, in the contrast AF, the above-mentioned end reachability determination to predictively determine whether or not the focus position reaches an end position (one of a close end and an infinity end) of its movable range by the focus evaluation value acquisition timing in the camera body 200. This end reachability determination (prediction of reachability to the end position) is performed by using information on the focus evaluation value acquisition timing, the above-mentioned acceleration/deceleration data and end position data stored in the end position data memory 116 as a second memory. The end position data memory 116 is constituted by a storage element such as an EEPROM or a flash ROM. In the following description, the movable range of the focus position (focus lens 105) is referred to as "a focus movable range".

Figure 11:
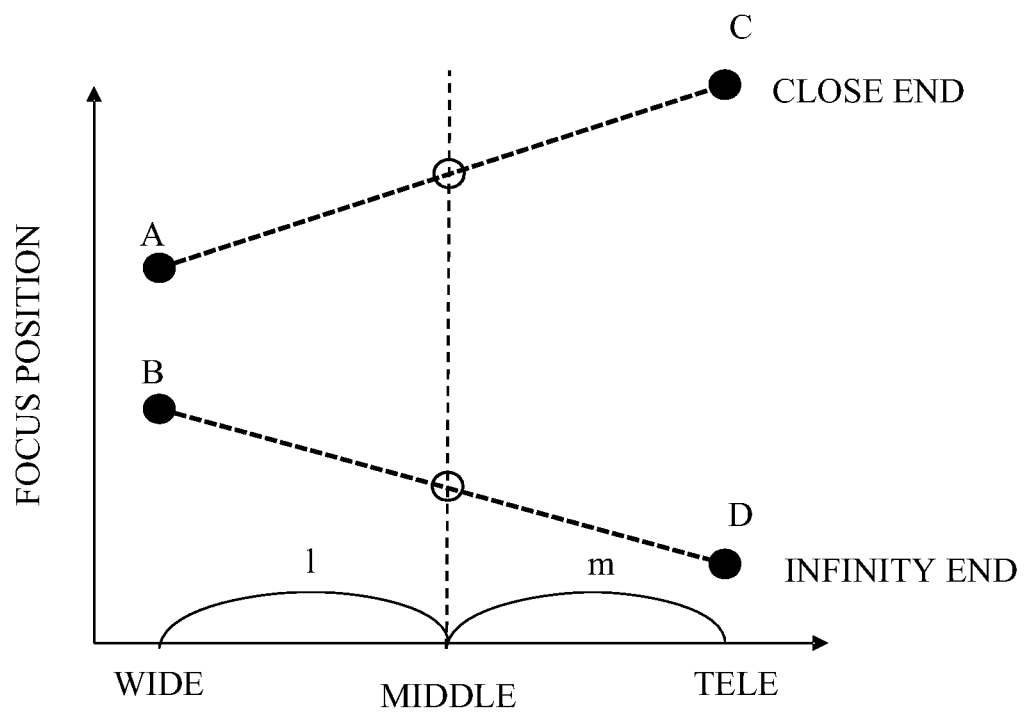
FIG. 11 shows end position data in Embodiment 1.

FIG. 11 shows an example of the end position data as table data. The movable range of a rear focus lens changes depending on position of the magnification-varying lens 102, that is, on focal length of the image pickup optical system (hereinafter referred to as "zoom position"). For example, according to a relation to optical sensitivity, the focus movable range becomes narrower when the zoom position is a wide-angle end (WIDE) than when the zoom position is a telephoto end (TELE). FIG. 11 shows the close end and the infinity end of the focus movable range at the wide-angle end by A and B, respectively. Moreover, FIG. 11 shows the close end and the infinity end of the focus movable range at the telephoto end by C and D, respectively.

When the close end and the telephoto end are linearly changed according to the zoom position as shown in FIG. 11, it is only necessary to store, as the end position data, data of the close ends A and C at the wide-angle and telephoto ends and data of the infinity ends B and D at the wide-angle and telephoto ends. The close end at a middle zoom position can be calculated by using the close ends A and C and a ratio l:m of a distance (l) from the wide-angle end to the middle zoom position and a distance (m) from the middle zoom position to the telephoto end. Similarly, the infinity end at the middle zoom position can be calculated by using the infinity ends B and D and the ratio of l:m. As the end position data, data of the close and telephoto ends at one or more zoom positions other than the wide-angle end and the telephoto end may be stored.

Although this embodiment shows the end position of the focus movable range as "the close end" and "the infinity end", the end positions are not necessarily limited to such optical ends, and may be control ends (electrical ends) of drive of the focus actuator 108 or may be mechanical ends at which the focus lens 105 makes contact with another member. In other words, the end positions of the focus movable range are only necessary to be a close side end position and an infinity side end position.

Next, description will be made mainly of a basic process of the contrast AF performed by the camera control CPU 206 (camera AF controller 207) with reference to FIG. 2. In the following description, the drive of the focus actuator 108 is referred to as "the drive of the focus lens 105".

At step (hereinafter abbreviated as "S") 101, the camera control CPU 206 causes the focus lens 105, through the lens control CPU 110, to perform a wobbling drive in the optical axis direction to determine the in-focus direction. The wobbling drive is a repetitive reciprocating drive of the focus lens 105 to a close side and an infinity side with respect to a predetermined center position with a minute movement amount (predetermined amplitude). The camera control CPU 206 acquires the focus evaluation value signals before and after each drive in the reciprocating drive and moves the center position of the reciprocating drive in a direction in which the focus evaluation value increases. The camera control CPU 206 repeats this operation until determining that the direction in which the focus evaluation value increases is a same direction a predetermined number of times.

Next, at S102, the camera control CPU 206 determines whether or not a determination has been made that the focus lens 105 reaches (will reach) the end position of the focus movable range during the wobbling drive by the end reachability determination performed by the lens control CPU 110 (focus end position predictor 115). If the determination that the focus lens 105 reaches the end position has not been made, the camera control CPU 206 proceeds to S103. If the determination that the focus lens 105 reaches the end position has been made, the camera control CPU 206 proceeds to S109.

At S109, the camera control CPU 206 determines whether or not the focus position exceeds (will exceed) the end position by a movement of the focus lens 105 corresponding to the predetermined amplitude from the center position of the wobbling (reciprocating) drive on an end position side. If the focus position does not exceed the end position (that is, the end position is away from the end position by a distance more than the predetermined amplitude), the camera control CPU 206 proceeds to S103. On the other hand, if the focus position exceeds the end position, the camera control CPU 206 proceeds to S112.

At S112, the camera control CPU 206 changes a condition of the wobbling drive so as to prevent the focus position from exceeding the end position by, for example, shifting the center position of the reciprocating drive or reducing the amplitude thereof. Then, the camera control CPU 206 returns to S101.

At S103, the camera control CPU 206 determines whether or not a peak of the focus evaluation value, that is, an in-focus state has been detected by the wobbling drive. If determining that the peak of the focus evaluation value has been detected, the camera control CPU 206 proceeds to S113 to determine whether or not restarting of the contrast AF (hereinafter referred to as "AF restart") is required. The AF restart is required when, for example, the focus evaluation value significantly changes or an aperture value of the aperture stop 103 is changed. If the AF restart is not required, the camera control CPU 206 proceeds to S114 and stops the drive of the focus lens 105. On the other hand, if the AF restart is required, the camera control CPU 206 returns to S101.

On the other hand, at S103, if determining that the peak of the focus evaluation value has not been detected, the camera control CPU 206 proceeds to S104 to perform a peak climbing drive of the focus lens 105 in a direction in which the peak is presumed to exist, that is, in a direction in which the focus evaluation value increases. In the peak climbing drive, the camera control CPU 206 acquires the focus evaluation value signal at every predetermined drive amount of the focus lens 105. The focus evaluation value increases until reaching the peak and then decreases. Therefore, detecting switching from the increase to the decrease enables detection of the peak.

Then, at S105 the camera control CPU 206 determines whether or not a determination have been made that the focus position reaches (will reach) the end position of the focus movable range during the peak climbing drive by the end reachability determination performed by the lens control CPU 110. If the determination that the focus lens 105 reaches the end position has not been made, the camera control CPU 206 proceeds to S106. If the determination that the focus lens 105 reaches the end position has been made, the camera control CPU 206 proceeds to S110.

At S110, the camera control CPU 206 determines whether or not the direction of the peak climbing drive has already been reversed because the peak of the focus evaluation value has not been detected by the peak climbing drive in one direction. If the direction of the peak climbing drive has already been reversed and the peak of the focus evaluation value has not been detected, the camera control CPU 206 regards the in-focus position as being located (that is, determines that the in-focus position is located) outside the focus movable range and proceeds to S115.

At S115, the camera control CPU 206 causes the display device 205 to display focusing impossibility information showing that it is in an out-of-focus state (that is, it is impossible to obtain the in-focus state) to inform it to a user. Then, at S114, the camera control CPU 206 stops the drive of the focus lens 105 and proceeds to S113 (AF restart determination).

On the other hand, at S110, if determining that the direction of the peak climbing drive has not yet been reversed, the camera control CPU 206 proceeds to S111 to reverse the direction of the peak climbing drive in order to perform the peak climbing drive in an area of the focus movable range where the peak climbing drive has not yet been performed. Then, the camera control CPU 206 returns to S104.

Furthermore, the camera control CPU 206, which has proceeded to S106 because of the determination at S105 that the focus position does not reach the end position, determines whether or not the focus evaluation value has passed the peak (in other words, whether or not the focus evaluation value has switched from increase to decrease). If the focus evaluation value has not passed the peak, the camera control CPU 206 continues the peak climbing drive. If the focus evaluation value has passed the peak, the camera control CPU 206 proceeds to S107 to drive (return) the focus lens 105 to a peak position (in-focus position) where the focus evaluation value becomes the peak.

Then, at S108, the camera control CPU 206 determines whether or not the focus lens 105 has reached (returned to) the peak position. If the focus lens 105 has reached the peak position, the camera control CPU 206 returns to S101 to perform the wobbling drive again. If the focus lens 105 has not yet reached the peak position, the camera control CPU 206 returns to S107 to continue the drive of the focus lens 105 to the peak position.

Thus, the results of the end reachability determination performed by the lens control CPU 110 are used for the wobbling drive and the peak climbing drive in the contrast AF. Moreover, the focus evaluation value signal and the predictive focus position are used for the wobbling drive and the determinations of whether the focus position has passed and whether the focus position has reached the peak position.

Next, description will be made of processes respectively performed by the camera control CPU 206 (camera AF controller 207) and the lens control CPU 110 in the contrast AF with reference to a flowchart shown in FIG. 3 and timing charts shown in FIGS. 4 and 5.

Figure 4:
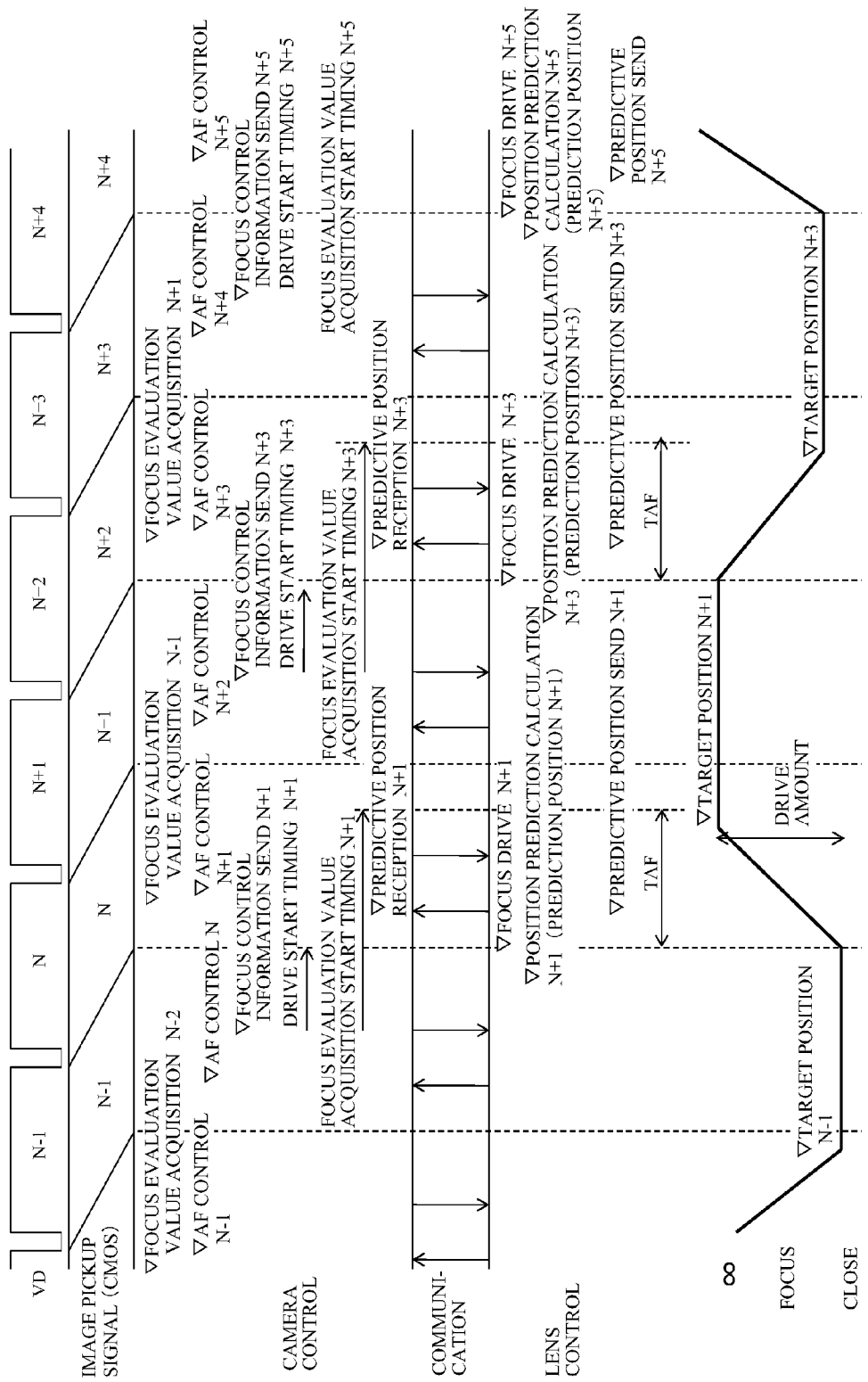
FIGS. 4 and 5 are each a timing chart of the contrast AF in Embodiment 1.
Figure 5:
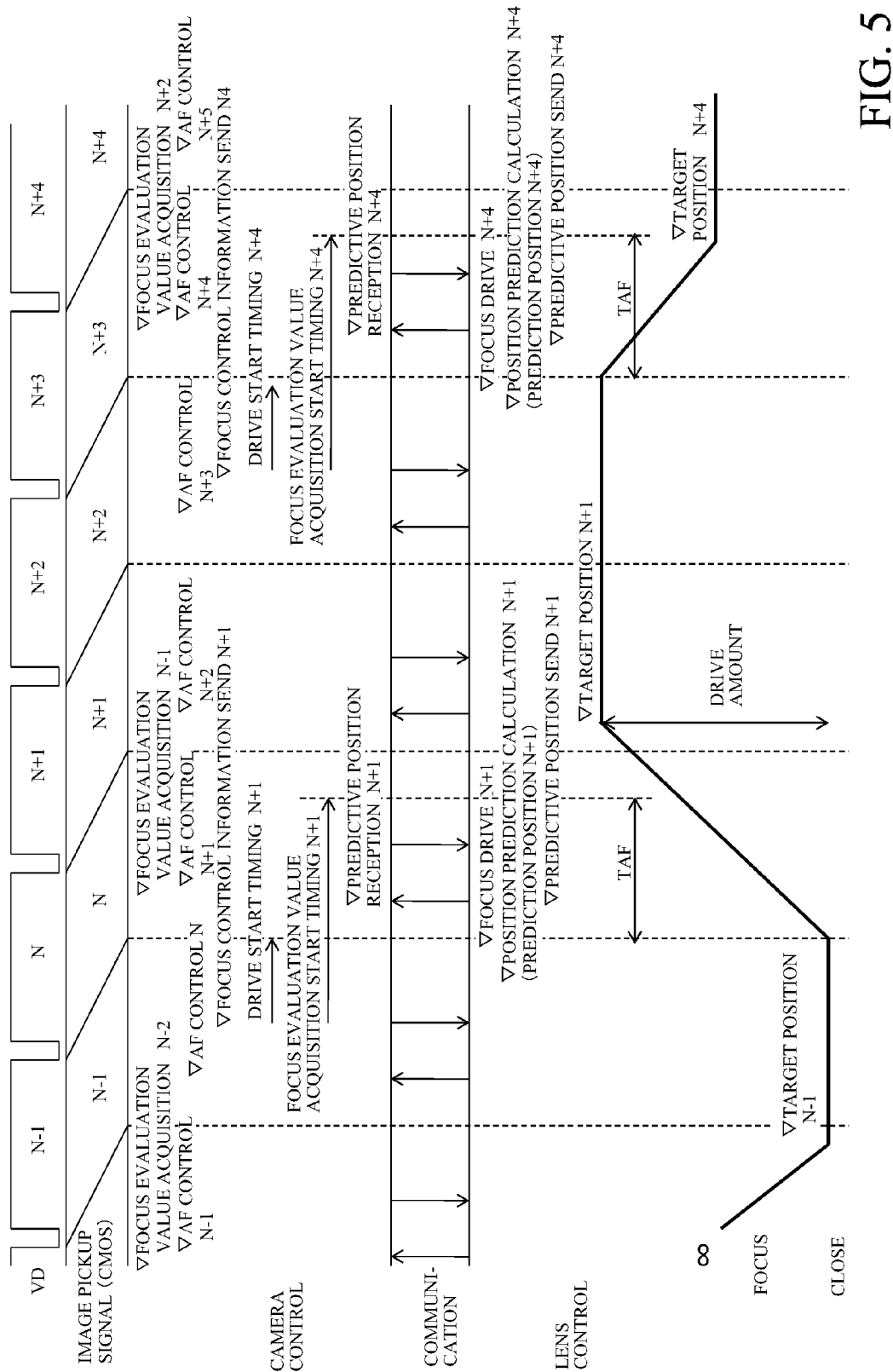

First, at S301, the camera control CPU 206 sends the focus control information (lens control information) to the lens control CPU 110 by the secondary communication, which will be specifically described using FIGS. 4 and 5. The camera control CPU 206 sends, at a focus control information send (lens control information send) N+1, a drive start timing N+1 of the focus lens 105 and a focus evaluation value acquisition start timing N+1 that are the timing information, to the lens control CPU 110. Moreover, the camera control CPU 206 also sends a drive start timing N+1 that is the target focus position information to the lens control CPU 110.

At S201, the lens control CPU 110 receives the focus control information and temporarily stores it. After the receipt of the focus control information, at S202, the lens control CPU 110 clears its timer and further sets a timer interrupt so as to enable start of the drive of the focus lens 105 at the drive start timing.

Next, at S203, the lens control CPU 110 performs a position prediction calculation N+1. A predictive focus position obtained at this step is referred to as "a predictive position N+1". In the position prediction calculation, the lens control CPU 110 first performs the target reachability determination to predictively determine in terms of time whether or not the focus lens 105 is able to reach the target position N+1 by the focus evaluation value acquisition start timing N+1. The target reachability determination will be described in detail later with reference to FIG. 8. Specifically, the lens control CPU 110 determines whether or not it is possible to drive the lens 105 by a drive amount from a current focus position to the target position N+1 within a target drive time period (target time period) Taf from the drive start timing N+1 to the focus evaluation value acquisition start timing N+1. FIG. 4 shows a case where it is possible to drive the focus lens 105 within the target drive time period Taf, and, on the other hand, FIG. 5 shows a case where it is not possible to drive the focus lens 105 within the target drive time period Taf.

Then, the lens control CPU 110 performs, depending on a result of the target reachability determination, different position prediction calculations, that is, a calculation of the predictive focus position using the acceleration/deceleration data and a calculation of the predictive focus position without using the acceleration/deceleration data (in other words, a setting of a position identical to the target focus position).

In addition, the lens control CPU 110 performs the end reachability determination to determine whether or not the predictive focus position at the focus evaluation value acquisition start timing N+1 acquired by the position prediction calculation is the end position of the focus movable range or a position therebeyond. In other words, the lens control CPU 110 determines, as described above, whether or not the focus position reaches the end position of the focus movable range by the focus evaluation value acquisition start timing N+1. The end position is calculated by using the end position data stored in the end position data memory 116.

After completion of the position prediction calculation and the end reachability determination, the lens control CPU 110 at S204 waits for generation of the timer interrupt set S202 and at step S205 starts the drive of the focus lens 105 in response to the generation of the timer interrupt.

Then, at S206, the lens control CPU 110 sends the results of the position prediction calculation (that is, the predictive position) and the end reachability determination at S203 to the camera control CPU 206 by the primary communication.

At S302, the camera control CPU 206 receives the results of the predictive position and the end reachability determination from the lens control CPU 110.

Next, at S303, the camera control CPU 206 determines whether a current focus drive mode is a drive mode to perform next drive of the focus lens 105 or a stop mode to acquire the focus evaluation value. If the current focus drive mode is the drive mode, the camera control CPU 206 proceeds to S304. If the current focus drive mode is the stop mode, the camera control CPU 206 proceeds to S308.

At S304, the camera control CPU 206 decides a next target focus position (target position) on a basis of the predictive focus position received at S302. In addition, the camera control CPU 206 decides a next drive start timing of the focus lens 105 at S305.

In addition, the camera control CPU 206 at S306 decides a next focus evaluation value acquisition start timing, and at S307 sets a next focus drive mode to the stop mode.

Next, at S308, the camera control CPU 206 compares the predictive position N+1 with the target position N+1. If the predictive position N+1 coincides with the target position N+1, that is, the focus position is able to reach the target position N+1 by the focus evaluation value acquisition start timing N+1, the camera control CPU 206 acquires a focus evaluation value signal N+1 from an image pickup signal N+1 obtained at a timing VD(N+1) of the vertical synchronization signal (hereinafter referred to as "a vertical synchronization timing) and then stores it. The camera control CPU 206 thus acquires the focus evaluation value signal N+1 at the focus evaluation value acquisition start timing N+1.

Moreover, at S310, the camera control CPU 206 also stores the predictive position N+1 coinciding with the target position N+1.

Then, at S311, the camera control CPU 206 sets the next focus drive mode to the drive mode, and ends the process.

On the other hand, at S308, if the predictive position N+1 does not coincide with the target position N+1, that is, the focus position is not able to reach the target position N+1 by the focus evaluation value acquisition start timing N+1, the camera control CPU 206 temporarily ends the process. Then, as shown in FIG. 5, the camera control CPU 206 acquires, without acquiring the focus evaluation value signal N+1 from the image pickup signal N+1, a focus evaluation value signal N+2 from a next image pickup signal N+2 and then stores it.

Figure 2:
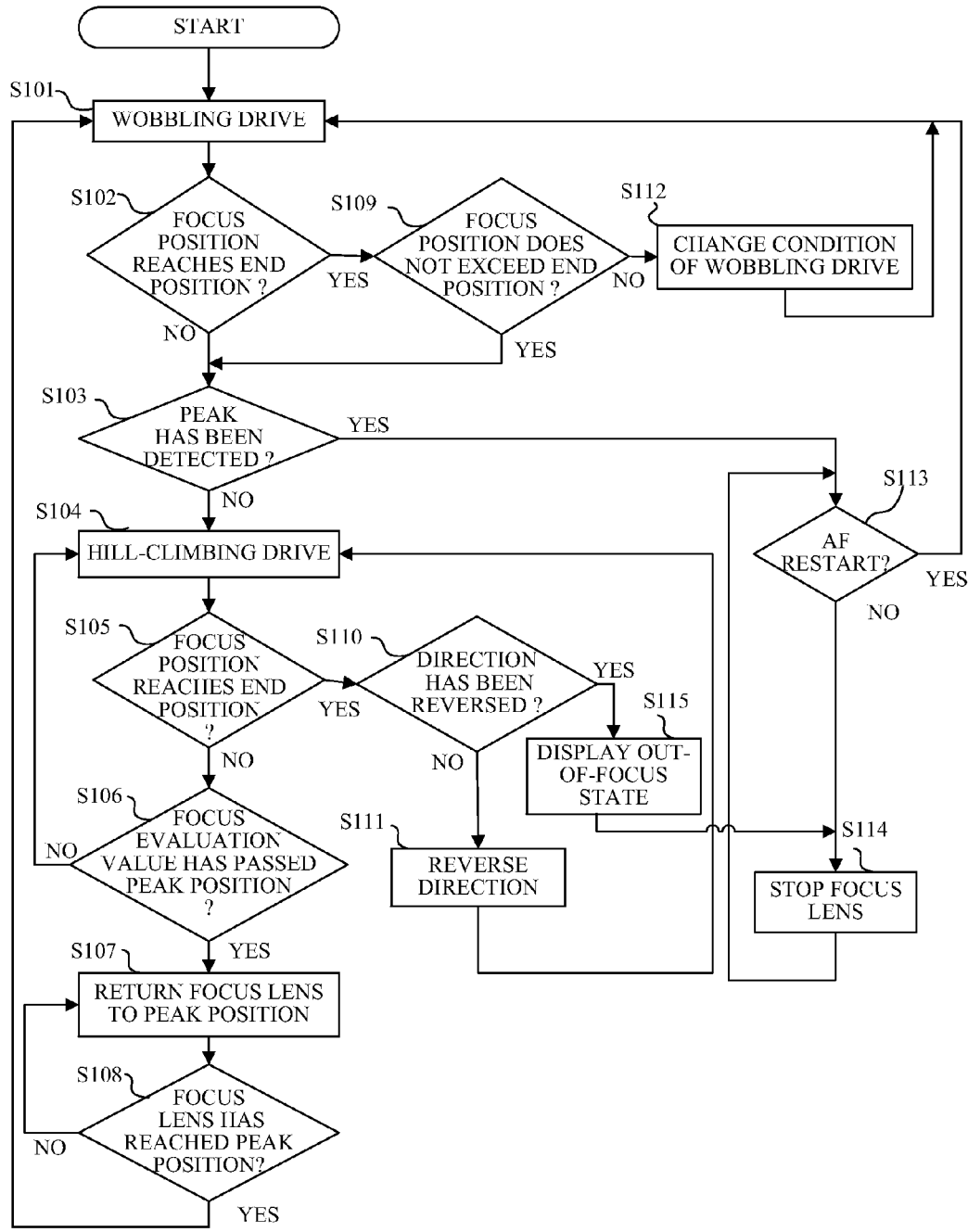
FIG. 2 is a flowchart showing a basic process of contrast AF in Embodiment 1.

The camera control CPU 206 performs the contrast AF described in FIG. 2 by using the focus evaluation value signal and the focus position thus stored.

Figure 3:
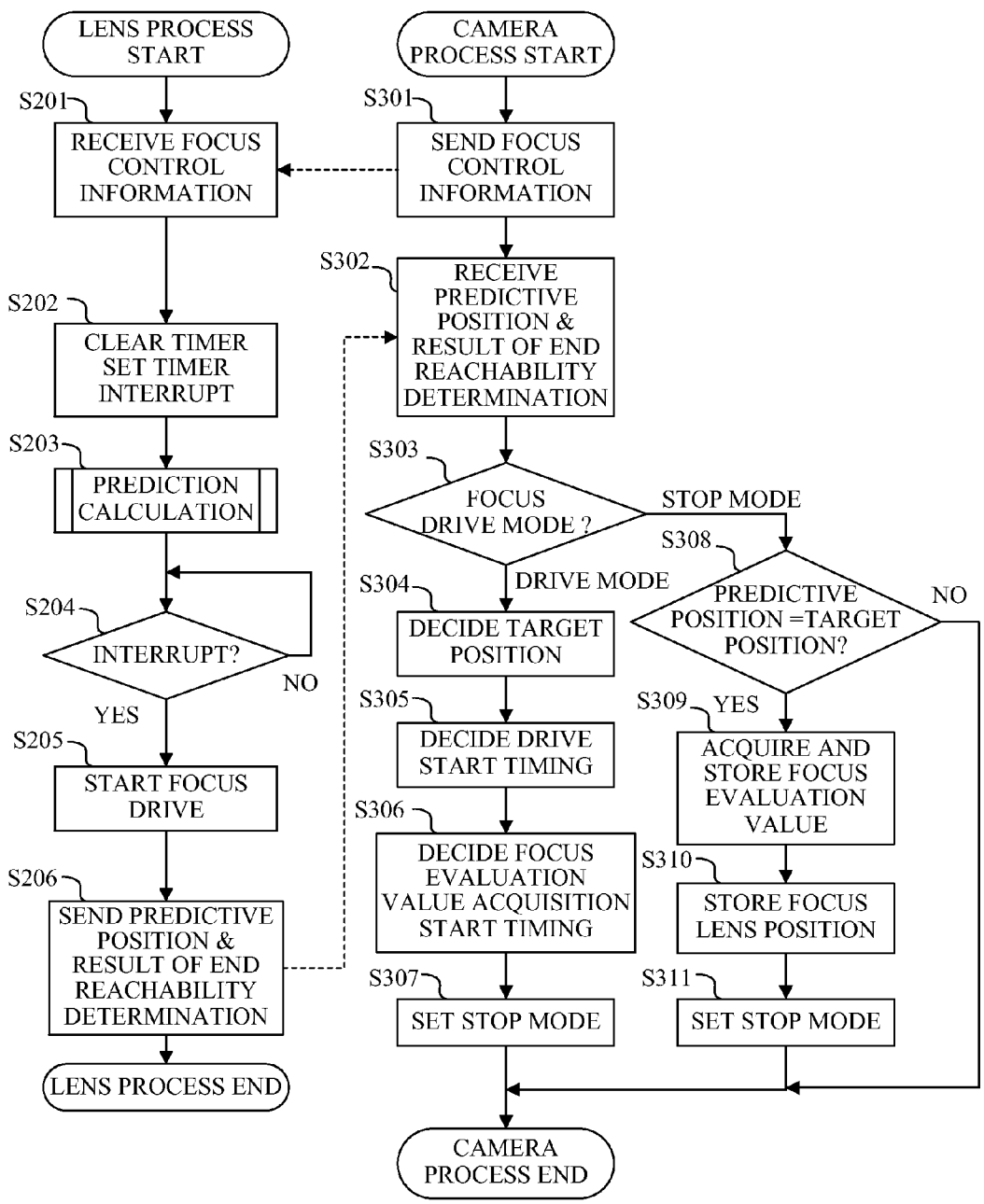
FIG. 3 is a flowchart of a contrast AF process performed by the interchangeable lens and the camera in Embodiment 1.

Moreover, the process shown in FIG. 3 is periodically executed at intervals corresponding to the period of the vertical synchronization timing VD. The primary communication and the secondary communication are periodically performed to execute other processes such as aperture stop control even in a case where the send of the focus control information and the send of the predictive position are not needed (for example, at vertical synchronization signal timings VD(N) and VD(N+2) shown in FIG. 4). In this case, dummy data or data same as that at a previous vertical synchronization timing is sent as the focus control information.

FIG. 3 shows, for simplifying the description, the case where the camera control CPU 206 ends the process when determining at S308 that the focus position is able to reach the target position N+1 by the focus evaluation value acquisition start timing N+1. However, actually, even when the focus position is not able to reach the target position, the focus position can be acquired as the predictive position. Therefore, the camera control CPU 206 can determine whether or not this predictive position reaches the end position of the focus movable range. Moreover, the camera control CPU 206 acquires and stores the focus evaluation value signal at the predictive position to use them for determination of whether or not the focus position becomes closer to the peak position in the peak climbing drive and for reversing the drive direction of the focus lens 105.

Figure 7B:
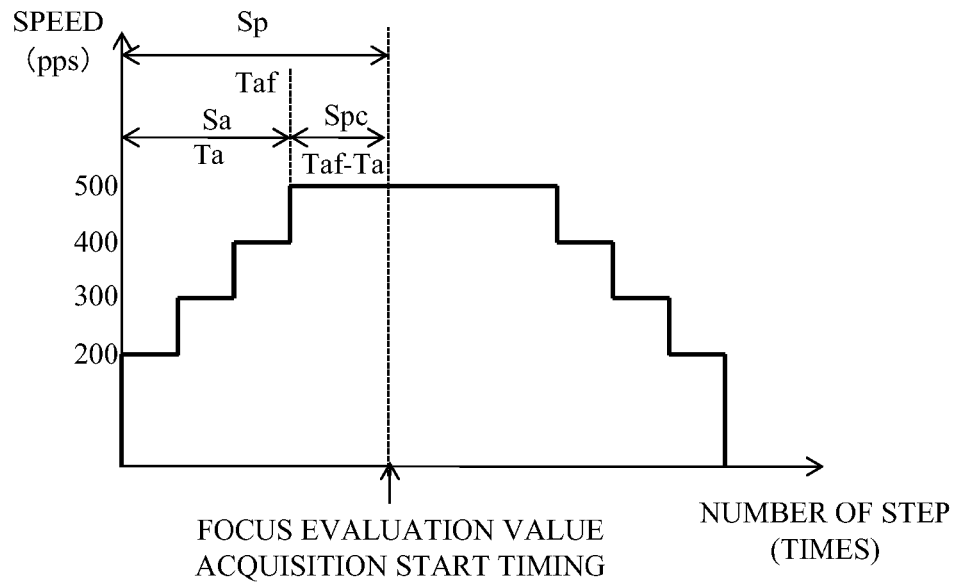
Figure 7C:
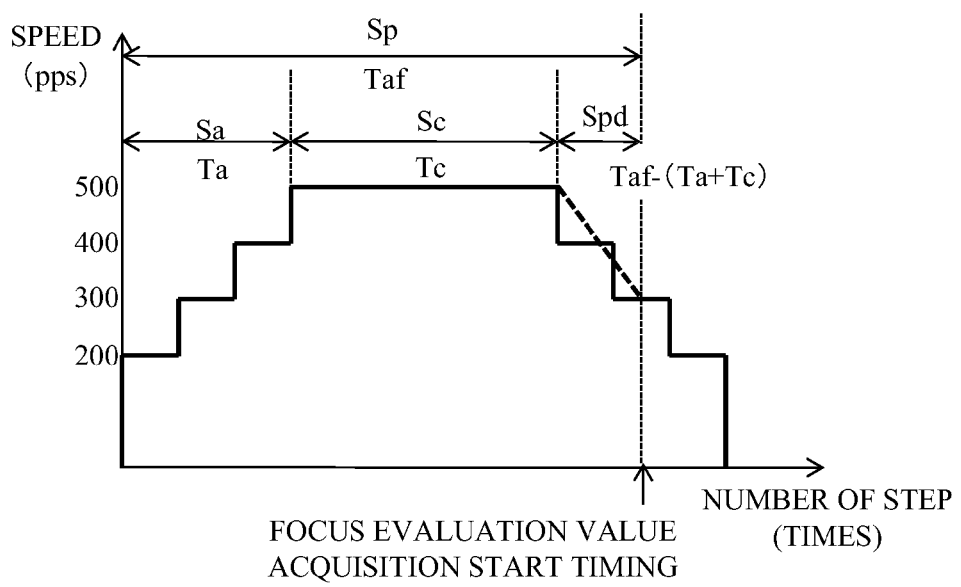

Next, detailed description will be made of the position prediction calculation performed by the lens control CPU 110 at S203 shown in FIG. 3 with reference to a flowchart of FIG. 8. FIGS. 7A to 7C show each a relationship between speed and number of steps (corresponding to time or focus position) when the focus lens 105 is driven by using the acceleration/deceleration data shown in FIG. 6.

Figure 8:
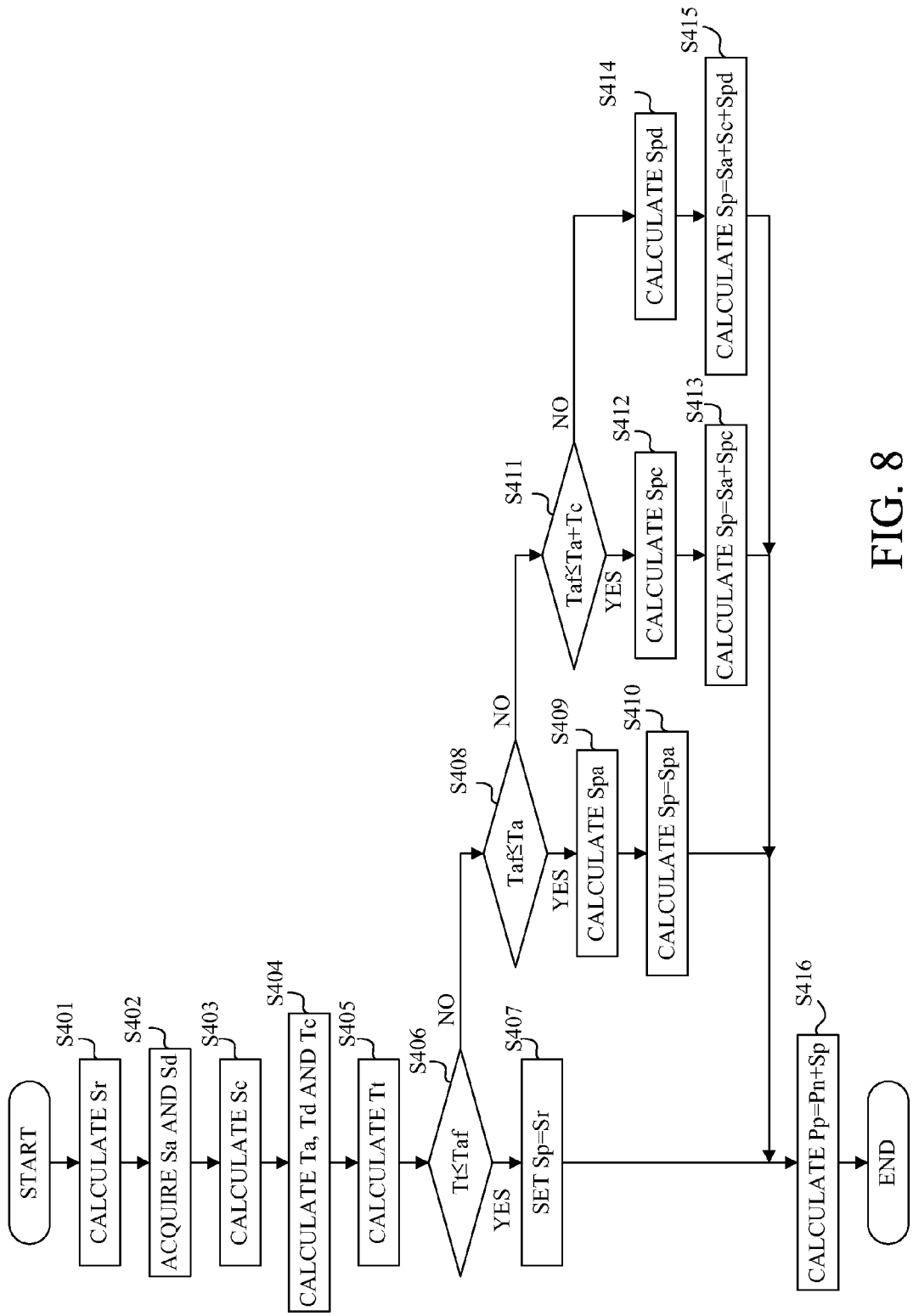
FIG. 8 is a flowchart showing a prediction focus lens position calculation process in Embodiment 1.

At S401 of FIG. 8, the lens control CPU 110 calculates a drive amount (remaining drive amount) Sr of the focus lens 105 corresponding to a difference between the target focus position and a current focus position Pn. The remaining drive amount Sr is calculated by adding a drive error amount due to backlash of the focus actuator 108 itself and of a mechanism that transmits driving force from the focus actuator 108 to the focus lens 105; the backlash is caused when a drive direction of the focus lens 105 (focus actuator 108) is reversed.

Next, at S402, the lens control CPU 110 acquires, from the acceleration/deceleration data stored in the acceleration/deceleration data memory 113, a number of steps (acceleration step number) Sa needed for acceleration of the focus actuator 108 and a number of steps (deceleration step number) Sd needed for deceleration thereof. For example, the lens control CPU 110 acquires an acceleration step number Sa of 3 steps and a deceleration step number Sd of 3 steps from the acceleration/deceleration data shown in FIG. 6. The acceleration/deceleration data shown in FIG. 6 is merely an example, and therefore the acceleration step number Sa may be different from the deceleration step number Sd. Moreover, calculation can be simplified when acceleration and deceleration of the focus lens 105 are not needed.

Next, at S403, the lens control CPU 110 calculates, by using the acceleration step number Sa and the deceleration step number Sd acquired at S402, a number of steps by which the focus lens 105 is to be driven at a constant speed (for example, 500 pps) as follows:

$$Sc=Sr-(Sa+Sd).$$

Next, at S404, the lens control CPU 110 calculates a predictive drive time period Tt that is a predictive time period required for drive of the focus lens 105 by the remaining drive amount Sr in the following three separate time periods: an acceleration time period Ta where an acceleration drive of the focus lens 105 is performed; a deceleration time period Td where a deceleration drive thereof is performed; and a constant speed time period Tc where a constant speed drive thereof is performed. For example, when using the acceleration data shown in FIG. 6, the acceleration time period Ta is calculated as follows:

$$Ta = 1/200 \text{ pps} \times 1\text{step} + 1/300 \text{ pps} \times 1\text{step} + 1/400 \text{ pps} \times 1\text{step}.$$

The deceleration time period Td is calculated similarly to the acceleration time period Ta. Moreover, the constant speed time period Tc is calculated as follows:

$$Tc = 1/500 \text{ pps} \times Sc.$$

Then, at S405, the lens control CPU 110 calculates the predictive drive time period Tt as follows:

$$Tt = Ta + Td + Tc.$$

Next, at S406, the lens control CPU 110 compares the predictive drive time period Tt with the target drive time period Taf. In other words, the lens control CPU 110 determines whether or not the predictive drive time period Tt is equal to or shorter than the target drive time period Taf. If the predictive drive time period Tt is equal to or shorter than the target drive time period Taf, a predictive drive amount Sp is equal to the remaining drive amount Sr at S407, and thus the focus position is able to reach the target focus position by the focus evaluation value acquisition start timing. In this case, the lens control CPU 110 proceeds to S416 to convert the predictive drive amount (relative position) Sp into a predictive position (absolute position) Pp as follows:

$$Pp = Pn + Sp.$$

On the other hand, if the predictive drive time period Tt is longer than the target drive time period Taf, the focus position is not able to reach the target focus position by the focus evaluation value acquisition start timing. The lens control CPU 110 calculates, only in this case, the predictive focus position by using the acceleration/deceleration data at S408 and subsequent steps.

At S408, the lens control CPU 110 performs a determination on an assumption that the focus evaluation value acquisition start timing is during the acceleration drive as shown in FIG. 7A, that is, determines whether or not the target drive time period Taf is equal to or shorter than the acceleration time period Ta. If the focus evaluation value acquisition start timing is during the acceleration drive (that is, the target drive time period Taf is equal to or shorter than the acceleration time period Ta), the lens control CPU 110 calculates a predictive acceleration drive amount Spa at S409 and substitutes it to the predictive drive amount Sp at S410. If the target drive time period Taf is not equal to or shorter than the acceleration time period Ta, the lens control CPU 110 proceeds to S411.

At S411, the lens control CPU 110 performs a determination on an assumption that the focus evaluation value acquisition start timing is during the constant speed drive as shown in FIG. 7B, that is, determines whether or not the target drive time period Taf is equal to or shorter than a time period of Ta+Tc. If the focus evaluation value acquisition start timing is during the constant speed drive (the target drive time period Taf is equal to or shorter than the time period of Ta+Tc), the lens control CPU 110 calculates a predictive constant speed drive amount Spc at S412 and calculates the predictive drive amount Sp (=Sa+Spc) at S413. If the target drive time period Taf is not equal to or shorter than the time period of Ta+Tc, the lens control CPU 110 proceeds to S414.

At S414, the lens control CPU 110 calculates, on an assumption that the focus evaluation value acquisition start timing is during the deceleration drive as shown in FIG. 7C, a predictive deceleration drive amount Spd. Then, at S415, the lens control CPU 110 calculates the predictive drive amount Sp (=Sa+Sc+Spd). Finally, the lens control CPU 110 proceeds to S416 to acquire the predictive focus position.

Description of a method of calculating the predictive drive amounts Spa, Spd and Spc will be made. The predictive acceleration drive amount Spa is a drive amount of the focus lens 105 accelerated during the target drive time period Taf. According to the acceleration data, since the speed is accelerated from 200 pps to 400 pps according to the acceleration data shown in FIG. 6A, the predictive acceleration drive amount Spa can be approximately calculated as follows by using an average speed of 300 pps:

$$Spa = 300 \text{ pps} \times Taf.$$

According to a more strict calculation, since a drive at 400 pps is a drive less than one step, the predictive acceleration drive amount Spa can be calculated as follows with consideration of this drive amount:

$$Spa = 400 \text{ pps} \times [Taf - (1\text{step}/200 \text{ pps}) - (1\text{step}/300 \text{ pps})] + 1\text{step} + 1\text{step}.$$

The predictive constant speed drive amount Spc can be calculated as follows since the drive speed is 500 pps:

$$Spc = 500 \text{ pps} \times (Taf - Ta).$$

The predictive deceleration drive amount Spd can be calculated as well as the predictive acceleration drive amount Spa, and therefore description thereof is omitted.

In this embodiment, the lens control CPU 110 performs at S405 the target reachability determination to determine in terms of time whether or not the focus position is able to reach the target focus position. Predicting the focus position and then comparing the predictive focus position with the target focus position (that is, performing the target reachability determination in terms of position) needs to calculate the predictive drive amounts Spa and Sp in order to calculate the predictive focus position, which makes the calculation complex and thereby increases a processing time required by the lens control CPU 110.

Thus, in this embodiment, the lens control CPU 110 first performs the target reachability determination in terms of time and then calculates the predictive focus position by using the acceleration/deceleration data only when the focus position is not able to reach the target focus position by the focus evaluation value acquisition start timing. This procedure makes it possible not only to perform the process faster when the focus position is able to reach the target focus position, but also to accurately calculate the predictive focus position when the focus position is not able to reach the target focus position.

Comparing the predictive focus position thus calculated with the end position of the focus movable range enables a good (fast and accurate) end reachability determination.

Moreover, in this embodiment, the lens control CPU 110 calculates, when calculating the target drive time period Tt for performing the target reachability determination in terms of time, the acceleration time period Ta and the deceleration time period Td without using approximation calculation. On the other hand, the lens control CPU 110 calculates, when calculating the predictive focus position in the case where the predictive focus position is necessary to be calculated, the predictive acceleration and deceleration drive amounts Sa and Sd by using approximation calculation, which enables faster prediction calculation of the focus position.

Although this embodiment described the case of performing the target reachability determination in terms of time, this does not mean that a case of performing a target reachability determination in terms of position is eliminated from embodiments of the present invention, that is, the case of performing the target reachability determination in terms of position is also included as an embodiment of the present invention.

Moreover, this embodiment described the case where the interchangeable lens sends, to the camera body, as the information depending on the result of the target reachability determination, the information on the predictive focus position obtained by different processes depending on the result of the target reachability determination. However, the interchangeable lens may send, to the camera body, the result of the target reachability determination itself as the information depending on the result of the target reachability determination.

[Embodiment 2]

Next, description will be made of a second embodiment (Embodiment 2) of the present invention. Configurations of an interchangeable lens and a camera body are same as those of the interchangeable lens and the camera body in Embodiment 1, and components in Embodiment 2 common to those in Embodiment 1 are denoted by same reference numerals as those in Embodiment 1.

In this embodiment, when performing the contrast AF, the lens control CPU 110 predicts a position of the focus lens 105 (focus position) by using focus actuator acceleration data and focus actuator deceleration data (hereinafter collective referred to as "acceleration/deceleration data) stored in the acceleration/deceleration data memory 113. The acceleration/deceleration data used in this embodiment includes, as shown in FIG. 9, speed information (pps) and time information (sec). That is, the acceleration/deceleration data in this embodiment expresses a drive amount for each speed by a drive time period, which is different from that expressed by the number of steps shown in FIG. 6 in Embodiment 1.

In focus position prediction in this embodiment, the lens control CPU 110 first performs a target reachability determination in terms of time, that is, a determination of whether or not the focus position is able to reach a target focus position within a required time period (target drive time period). If no, the lens control CPU 110 calculates a predictive focus position by using the acceleration/deceleration data.

Figure 10:
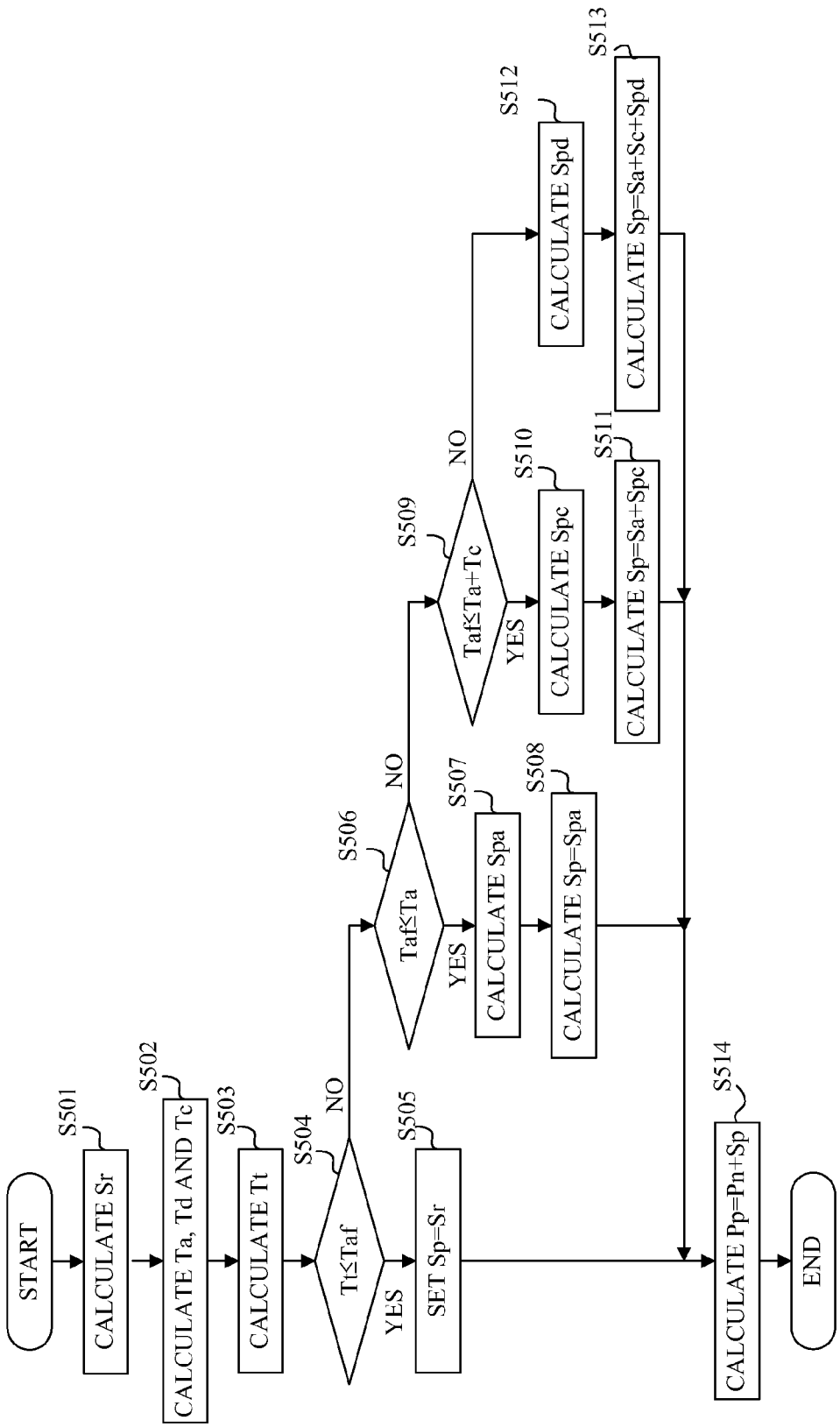
FIG. 10 is a flowchart showing a prediction focus lens position calculation process in Embodiment 1.

Description will be made of a position prediction calculation performed by the lens control CPU 110 with reference to a flowchart shown in FIG. 10. This position prediction calculation is performed in place of the position prediction calculation performed at S203 of FIG. 3 in Embodiment 1.

First, at S501, the lens control CPU 110 calculates a drive amount (remaining drive amount) Sr of the focus lens 105 corresponding to a difference between the target focus position and a current focus position Pn. The remaining drive amount Sr is calculated by adding a drive error amount due to backlash of the focus actuator 108 itself and of a mechanism that transmits driving force from the focus actuator 108 to the focus lens 105; the backlash is caused when a drive direction of the focus lens 105 (focus actuator 108) is reversed.

Next, at S502, the lens control CPU 110 calculates a predictive drive time period Tt that is a predictive time period required for drive of the focus lens 105 by the remaining drive amount Sr in the following three separate time periods: an acceleration time period Ta where an acceleration drive of the focus lens 105 is performed; a deceleration time period Td where a deceleration drive thereof is performed; and a constant speed time period Tc where a constant speed drive thereof is performed. For example, when using the acceleration data shown in FIG. 9, the acceleration time period Ta is calculated as follows:

$$Ta=5\times10^{-3}+5\times10^{-3}+5\times10^{-3}.$$

The deceleration time period Td is calculated similarly to the acceleration time period Ta. Moreover, the constant speed time period Tc is calculated as follows when a total number of steps of the acceleration drive and a total number of steps of the deceleration drive as are respectively represented by Sa and Sd:

$$Tc=[Sr-(Sa+Sd)]/500 \text{ pps.}$$

Then, at S503, the lens control CPU 110 calculates the predictive drive time period Tt as follows:

$$Tt=Ta+Td+Tc.$$

Next, at S504, the lens control CPU 110 compares the predictive drive time period Tt with the target drive time period Taf. In other words, the lens control CPU 110 determines whether or not the predictive drive time period Tt is equal to or shorter than the target drive time period Taf. If the predictive drive time period Tt is equal to or shorter than the target drive time period Taf, a predictive drive amount Sp is equal to the remaining drive amount Sr at S505, and thus the focus position is able to reach the target focus position by the focus evaluation value acquisition start timing. In this case, the lens control CPU 110 proceeds to S514 to convert the predictive drive amount (relative position) Sp into a predictive position (absolute position) Pp as follows:

$$Pp=Pn+Sp.$$

On the other hand, if the predictive drive time period Tt is longer than the target drive time period Taf, the focus position is not able to reach the target focus position by the focus evaluation value acquisition start timing. The lens control CPU 110 calculates, only in this case, the predictive focus position by using the acceleration/deceleration data at S506 and subsequent steps.

At S506, the lens control CPU 110 performs a determination on an assumption that the focus evaluation value acquisition start timing is during the acceleration drive, that is, determines whether or not the target drive time period Taf is equal to or shorter than the acceleration time period Ta. If the focus evaluation value acquisition start timing is during the acceleration drive (the target drive time period Taf is equal to or shorter than the acceleration time period Ta), the lens control CPU 110 calculates a predictive acceleration drive amount Spa at S507 and substitutes it to the predictive drive amount Sp at S508. If the target drive time period Taf is not equal to or shorter than the acceleration time period Ta, the lens control CPU 110 proceeds to S509.

At S509, the lens control CPU 110 performs a determination on an assumption that the focus evaluation value acquisition start timing is during the constant speed drive, that is, determines whether or not the target drive time period Taf is equal to or shorter than a time period of Ta+Tc. If the focus evaluation value acquisition start timing is during the constant speed drive (the target drive time period Taf is equal to or shorter than the time period of Ta+Tc), the lens control CPU 110 calculates a predictive constant speed drive amount Spc at S510 and calculates the predictive drive amount Sp (=Sa+Spc) at S511. If the target drive time period Taf is not equal to or shorter than the time period of Ta+Tc, the lens control CPU 110 proceeds to S512.

At S512, the lens control CPU 110 calculates, on an assumption that the focus evaluation value acquisition start timing is during the deceleration drive, a predictive deceleration drive amount Spd. Then, at S513, the lens control CPU 110 calculates the predictive drive amount Sp (=Sa+Sc+Spd). Finally, the lens control CPU 110 proceeds to S514 to acquire the predictive focus position.

Also in this embodiment, the target reachability determination is performed in terms of time at S504, which provides a same effect as that in Embodiment 1. Furthermore, in this embodiment, the drive amount in the acceleration/deceleration data is stored as the drive time period, which enables simplification of the calculation process for the acceleration time period Ta, the deceleration time period Td, the constant speed time period Tc and the predictive drive time period Tt as compared with Embodiment 1.

A combination of the acceleration/deceleration data in Embodiment 1 (FIG. 6) and the acceleration/deceleration data in Embodiment 2 (FIG. 9) may be made to store the speed information, the time information and the step number information as matrix data. This combination enables further simplification of the calculation process for the drive time period Tt.

Moreover, although each of the above embodiments described the case of storing each of the acceleration/deceleration data and the end position data as table data, each of these data may be stored as a calculating formula, and each data to be used may be calculated by the calculating formula when it is needed.

According to the above-described embodiments, since the interchangeable lens performs in the contrast AF the end reachability determination (prediction whether or not the focus lens reaches the end position) and sends the information showing the result thereof to the image pickup apparatus, the image pickup apparatus can perform appropriate contrast AF using the information.

Furthermore, the present invention is not limited to these embodiments and various variations and modifications may be made without departing from the scope of the present invention.

This application claims the benefit of Japanese Patent Application No. 2012-113614, filed on May 17, 2012, which is hereby incorporated by reference herein in its entirety.

What is claimed is:

1. An interchangeable lens detachably attachable to an image pickup apparatus and communicable with the image pickup apparatus, the interchangeable lens comprising:
   an image pickup optical system including a focus lens;
   a focus actuator that moves the focus lens;
   a first memory that stores speed control data to be used for control of drive speed of the focus actuator;
   a second memory that stores end position data showing an infinity side end position and a close side end position of a movable range of the focus lens; and
   a lens controller configured to control the drive speed of the focus actuator using the speed control data,
   wherein the image pickup apparatus comprises:
      an image sensor that photoelectrically converts an object image formed by the image pickup optical system into an image pickup signal; and
      a focus controller configured to acquire, using the image pickup signal, focus information corresponding to image contrast that changes with movement of the focus lens and to control a focusing movement of the focus lens to an in-focus position using the focus information, and
   wherein the lens controller is configured to:
      receive, from the focus controller, timing information showing a timing relating to acquisition of the focus information;
      perform an end reachability determination to predictively determine, using the timing information, the speed control data, and the end position data, whether or not the focus lens reaches one of the infinity side end position or the close side end position by a scheduled focus information acquisition timing at which the focus controller is to acquire the focus information;
      send result information showing a result of the end reachability determination to the focus controller.

2. An interchangeable lens according to claim 1, wherein the lens controller is configured to:
   receive, from the focus controller, as the timing information, information showing a movement start timing for starting the focusing movement of the focus lens and information showing the scheduled focus information acquisition timing;
   calculate, using the speed control data, a predictive time period from the movement start timing to a time at which the focus lens reaches a target focus information acquisition position at which the focus controller is to acquire the focus information;
   compare the predictive time period with a target time period from the movement start timing to the scheduled focus information acquisition timing;
   set, when the predictive time period is determined to be equal to or shorter than the target time period, the target focus information acquisition position to a predictive position of the focus lens;
   calculate, when the predictive time period is determined to be longer than the target time period, a predictive position of the focus lens at the scheduled focus information acquisition timing using the speed control data;
   perform the end position reachability determination by comparing the predictive position with the movable range end position.

3. A control method for an interchangeable lens detachably attachable to an image pickup apparatus and communicable with the image pickup apparatus,
   the interchangeable lens comprising:
      an image pickup optical system including a focus lens; and
      a focus actuator that moves the focus lens,
   the image pickup apparatus photoelectrically converting, with an image sensor, an object image formed by the image pickup optical system into an image pickup signal, acquiring, using the image pickup signal, focus information corresponding to image contrast that changes with movement of the focus lens, and controlling a focusing movement of the focus lens to an in-focus position using the focus information, and
   the method comprising the steps of:
      providing speed control data for controlling a drive speed of the focus actuator;
      providing end position data showing an infinity side end position and a close side end position of a movable range of the focus lens;
      receiving, from the image pickup apparatus, timing information showing a timing relating to acquisition of the focus information;
      performing an end reachability determination to predictively determine, using the timing information, the speed control data, and the end position data, whether or not the focus lens reaches one of the infinity side end position or the close side end position by a scheduled focus information acquisition timing at which a focus controller is to acquire the focus information; and
      sending result information showing a result of the end reachability determination to the image pickup apparatus.

4. An image pickup apparatus to which an interchangeable lens is detachably attachable and communicable with the interchangeable lens, the interchangeable lens comprising:
an image pickup optical system including a focus lens;
a focus actuator that moves the focus lens;
a first memory that stores speed control data for controlling a drive speed of the focus actuator;
a second memory that stores end position data showing an infinity side end position and a close side end position of a movable range of the focus lens; and
a lens controller configured to control the drive speed of the focus actuator by using the speed control data,
the image pickup apparatus comprising:
an image sensor that photoelectrically converts an object image formed by the image pickup optical system into an image pickup signal; and
a focus controller configured to acquire, using the image pickup signal, focus information corresponding to image contrast that changes with movement of the focus lens and control a focusing movement of the focus lens to an in-focus position by using the focus information,
wherein the focus controller is configured to send, to the lens controller, timing information showing a timing relating to acquisition of the focus information,
wherein the lens controller is configured to:
perform an end reachability determination to predictively determine, using the timing information, the speed control data, and the end position data, whether or not the focus lens reaches one of the infinity side end position or the close side end position by a scheduled focus information acquisition timing at which the focus controller is to acquire the focus information;
send result information showing a result of the end reachability determination to the focus controller, and
wherein the focus controller performs the focus control using the result information.

5. An image pickup apparatus according to claim 4, wherein the focus controller is configured to stop the movement of the focus lens when (a) receiving, from the lens controller, the result information showing that the focus lens reaches the one of the infinity side end position or the close side end position and (b) determining that the in-focus position is located outside the movable range.

6. An image pickup apparatus according to claim 4, wherein the focus controller is configured to provide, to a user, focusing impossibility information showing that an in-focus state is impossible to be obtained when (a) receiving, from the lens controller, the result information showing that the focus lens reaches the one of the infinity side end position or the close side end position and (b) determining that the in-focus position is located outside the movable range.

7. An image pickup apparatus according to claim 4, wherein the focus controller is configured to perform:
a reciprocating drive of the focus lens with a predetermined amplitude in the focus control to determine a direction of the in-focus position; and
change, when receiving the result information showing that the focus lens reaches the one of the infinity side end position or the close side end position from the lens controller, a condition of the reciprocating drive to prevent a position of the focus lens from exceeding the one of the infinity side end position or the close side end position.

8. A control method for an image pickup apparatus to which an interchangeable lens is detachably attachable,
the interchangeable lens comprising:
an image pickup optical system including a focus lens;
a focus actuator that moves the focus lens;
a first memory that stores speed control data for controlling a drive speed of the focus actuator; and
a second memory that stores end position data showing an infinity side end position and a close side end position of a movable range of the focus lens,
wherein the interchangeable lens controlling drive speed of the focus actuator using speed control data,
the image pickup apparatus comprising:
an image sensor that photoelectrically converts an object image formed by the image pickup optical system into an image pickup signal; and
a focus controller configured to acquire, using the image pickup signal, focus information corresponding to image contrast that changes with movement of the focus lens and control a focusing movement of the focus lens to an in-focus position by using the focus information, and
the method comprising the steps of:
sending, to the interchangeable lens, timing information showing a timing relating to acquisition of the focus information;
receiving, from the interchangeable lens that performs an end reachability determination to predictively determine, using the timing information, the speed control data, and the end position data, whether or not the focus lens reaches one of the infinity side end position or the close side end position by a scheduled focus information acquisition timing at which the focus controller is to acquire the focus information;
sending result information showing a result of the end reachability determination; and
performing the focus control using the result information.

9. An image pickup system comprising:
an interchangeable lens; and
an image pickup apparatus to which the interchangeable lens is detachably attachable and communicable therewith,
wherein the interchangeable lens includes:
an image pickup optical system including a focus lens;
a focus actuator that moves the focus lens;
a first memory that stores speed control data for controlling a drive speed of the focus actuator;
a second memory that stores end position data showing an infinity side end position and a close side end position of a movable range of the focus lens; and
a lens controller configured to control the drive speed of the focus actuator by using the speed control data,
wherein the image pickup apparatus includes:
an image sensor that photoelectrically converts an object image formed by the image pickup optical system into an image pickup signal; and
a focus controller configured to acquire, using the image pickup signal, focus information corresponding to image contrast that changes with movement of the focus lens and control a focusing movement of the focus lens to an in-focus position using the focus information,
wherein the focus controller is configured to send, to the lens controller, timing information showing a timing relating to acquisition of the focus information,
wherein the lens controller is configured to:

receive, from the focus controller, the timing information;

perform an end reachability determination to predictively determine, using the timing information, the speed control data, and the end position data, whether or not the focus lens reaches one of the infinity side end position or the close side end position by a scheduled focus information acquisition timing at which the focus controller is to acquire the focus information; and send result information showing a result of the end reachability determination to the focus controller, and wherein the focus controller performs the focus control using the result information.

10. An interchangeable lens according to claim 1, wherein the lens controller causes the focus controller to perform a focus control to prevent a position of the focus lens from exceeding the one of the infinity side end position or the close side end position by sending the result information showing that the focus lens reaches the one of the infinity side end position or the close side end position to the focus controller.

11. A control method according to claim 3, further comprising the step of causing the image pickup apparatus to perform a focus control to prevent a position of the focus lens from exceeding the one of the infinity side end position or the close side end position by sending the result information showing that the focus lens reaches the one of the infinity side end position or the close side end position to the image pickup apparatus.

12. An image pickup apparatus according to claim 4, wherein the focus controller performs a focus control to prevent a position of the focus lens from exceeding the one of the infinity side end position or the close side end position when receiving, from the lens controller, information showing that the focus lens reaches the one of the infinity side end position or the close side end position by the scheduled focus information acquisition timing.

13. A control method according to claim 8, further comprising the step of performing a focus control to prevent a position of the focus lens from exceeding the one of the infinity side end position or the close side end position when receiving, from the interchangeable lens, information showing that the focus lens reaches the one of the infinity side end position or the close side end position by the scheduled focus information acquisition timing.

* * * * *